United States Patent [19]

Young

[11] Patent Number: 5,366,314
[45] Date of Patent: Nov. 22, 1994

[54] CONNECTOR FOR DETACHABLY CONNECTING A SHAFT TO AN IMPLEMENT

[75] Inventor: Ronald A. Young, Stourbridge, England

[73] Assignee: Scot Young Research Limited, West Midlands, England

[21] Appl. No.: 982,987

[22] Filed: Nov. 30, 1992

[30] Foreign Application Priority Data

Nov. 28, 1991 [GB] United Kingdom ............... 9125324

[51] Int. Cl.⁵ ............................................. B25G 3/30
[52] U.S. Cl. ............................... 403/299; 403/287; 403/343; 403/192; 15/145
[58] Field of Search .............. 403/299, 342, 343, 361, 403/333, 334, 314, 192, 194, 287, 306–308; 15/147.1, 145; 285/334, 390, 357, 393

[56] References Cited

U.S. PATENT DOCUMENTS

| | | | |
|---|---|---|---|
| 539,155 | 5/1895 | Tower | 15/145 |
| 630,073 | 8/1899 | Riffel | 403/287 |
| 756,339 | 4/1904 | Down | 403/343 X |
| 1,479,263 | 1/1924 | Sturgis | 403/342 X |
| 2,835,914 | 5/1958 | Littleton | 15/145 X |
| 3,520,561 | 7/1970 | Rininger | 403/299 X |
| 3,521,349 | 7/1970 | Gehring | 403/194 X |
| 4,433,931 | 2/1984 | Malish et al. | 403/287 X |
| 4,541,139 | 9/1985 | Jones et al. | 15/171 |
| 4,642,837 | 2/1987 | Nichols et al. | 15/145 X |
| 4,697,949 | 10/1987 | Perez | 403/361 |
| 4,722,634 | 2/1988 | Malish | 403/299 |

FOREIGN PATENT DOCUMENTS

| | | | |
|---|---|---|---|
| 252187 | 1/1988 | European Pat. Off. | 403/299 |
| 344070 | 8/1904 | France | 403/343 |
| 2567729 | 1/1986 | France . | |
| 648489 | 8/1937 | Germany | 403/343 |
| 2702316 | 7/1978 | Germany | 403/287 |
| 3001495 | 7/1981 | Germany . | |
| 90458 | 9/1921 | Switzerland . | |

Primary Examiner—Randolph A. Reese
Assistant Examiner—Harry C. Kim
Attorney, Agent, or Firm—Young & Thompson

[57] ABSTRACT

A connector for connecting a shaft to an implement, for example for connecting a handle to a mop head, comprises two engageable components for mounting on a shaft and an implement respectively. One of the components has a boss formed with an internal threaded socket and an outer peripheral surface. The other component has a central threaded spigot which screws into the socket, and a shroud, surrounding the spigot and spaced therefrom, which is internally tapered and frictionally engages the outer surface of the boss for added support.

7 Claims, 3 Drawing Sheets

CONNECTOR FOR DETACHABLY CONNECTING A SHAFT TO AN IMPLEMENT

BACKGROUND OF THE INVENTION

The invention provides a connector for detachably connecting a shaft to an implement. It is particularly suitable for use in connecting an elongate handle to a cleaning implement, such as a floor mop, but it is also capable of many other similar applications.

It is often desirable that a connector for connecting a handle to an implement should be detachable. Not only can this facilitate packaging and storage but it enables a supplier to keep a stock of similar handles which may be supplied for use with a variety of different implements, according to demand. Also, a user may then require only a single handle which may be used interchangeably with a whole range of different implements. Detachable connectors often therefore comprise two engageable components, one component for mounting on a handle and the other for mounting on the implement.

In one common form of connector the component for mounting on the handle comprises an externally threaded spigot which may be screwed into an internally threaded socket on a second component for mounting on the implement. For cheapness and ease of manufacture the components are often formed from plastics.

While such connectors are very suitable for implements which have only comparatively light use, it is sometimes found, particularly with cleaning implements which undergo heavy industrial use, that the connectors can fail. With time the engagement between the threaded spigot and the socket may loosen, or the weight of the implement, or the heavy use to which it is subjected, may result in the threaded spigot bending or even snapping. This may be particularly liable to occur if the handle is to be used interchangeably with a whole range of implements, since the repeated connection and disconnecting can cause rapid failure of conventional screwed connectors. The present invention sets out to provide an improved form of connector which may be stronger and less liable to failure in use.

SUMMARY OF THE INVENTION

According to the invention there is provided a connector comprising two engageable components for mounting on a shaft and an implement respectively, one of said components having a boss formed with an internal socket and having an outer peripheral surface surrounding the socket, and the other component having a central spigot adapted to fit within the socket and a shroud at least partly surrounding the spigot and spaced therefrom and adapted to engage said outer peripheral surface of the boss when the spigot is received within the socket, the spigot and socket, and/or the shroud and peripheral surface, being adapted for screw-threaded engagement with one another.

In a connector according to the invention, therefore, the engagement between the shroud and the outer surface of the boss serves to provide additional support for the spigot fitted within the socket and may thus reduce any tendency for the spigot to weaken or break.

Preferably the spigot is adapted for screw-threaded engagement with the socket and the shroud is adapted for frictional engagement with the outer surface of the boss. In this case, therefore, the connector comprises essentially a prior art screw connector, of the type referred to above, with the addition of a shroud which engages the outer surface of the boss in which the threaded socket is formed, so as to provide additional strength. However, as mentioned above, the invention also includes arrangements where the shroud is also in screw-threaded engagement with the outer surface of the boss, and also arrangements where the spigot and socket are not screw-threaded but are in frictional engagement, the sole screw-threaded engagement being provided between the shroud and the outer surface of the boss.

It will be appreciated that in the case where both the shroud and the spigot are in screw-threaded engagement with the boss it is necessary that the pitches of the two screw-threads should be substantially the same.

In the case where the shroud is adapted for frictional engagement with the outer surface of the boss, said outer surface may be formed with outstanding projections which are frictionally engaged by the inner surface of the shroud. For example, said projections may be in the form of circumferentially spaced ribs extending substantially axially of the boss.

The inner surface of the shroud, and/or the outer surface of the boss, may be tapered so as to increase the frictional engagement between the shroud and boss as the spigot is screwed into the socket.

In any of the above arrangements the outer surface of the shroud may include formations to facilitate gripping and manipulation of the component on which it is provided. For example, said formations may comprise circumferentially spaced ribs extending generally axially of the shroud.

Preferably the component having the spigot and shroud is adapted for mounting on the shaft. It may, for example, be formed with a socket to receive and retain the end of the shaft. In this case the socket to receive the shaft is preferably substantially coaxial with the spigot and shroud.

The other component, adapted for mounting on the implement, may include a generally circular flange structure, generally coaxial with the boss and extending outwardly therefrom at one end of the boss, said flange structure having means, such as mounting holes, for use in securing it to an implement.

DETAILED DESCRIPTION OF THE PREFERRED EMBODIMENT

Figure 1:
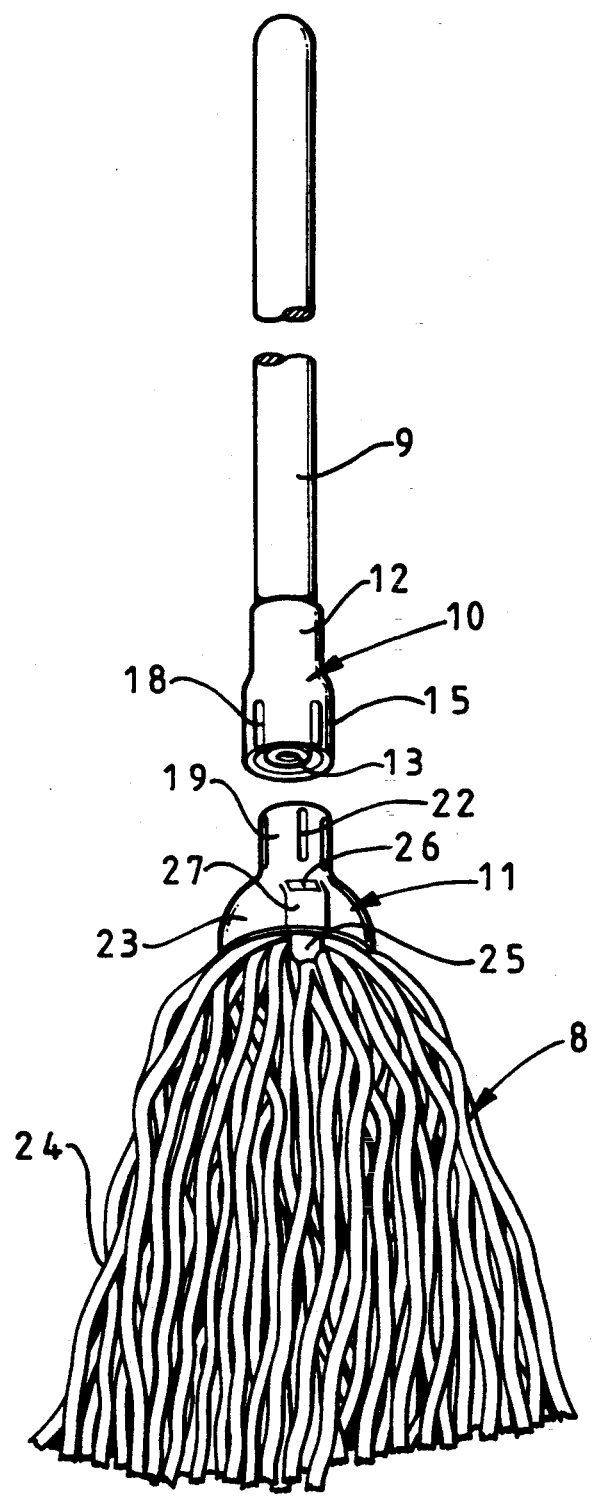
FIG. 1 is a perspective view of a floor mop incorporating a connector in accordance with the invention, the handle being shown detached from the mop head.

The two components of the connector are formed from plastics material and comprise a first component 10 for mounting on a shaft, in this case the elongate handle 9 of a floor mop, and a second component 11 adapted for mounting on an implement, in this case the head 8 of the floor mop.

The first component 10 comprises a generally cylindrical socket 12 adapted to fit tightly over the end of the elongate wooden, plastics or metal handle 9, which is of circular cross-section. The socket 12 may simply be a friction fit on the end of the handle 9 or it may be secured to the handle by an adhesive or by screws or pins passing through the wall of the socket 12 and into the body of the handle.

Figure 2:
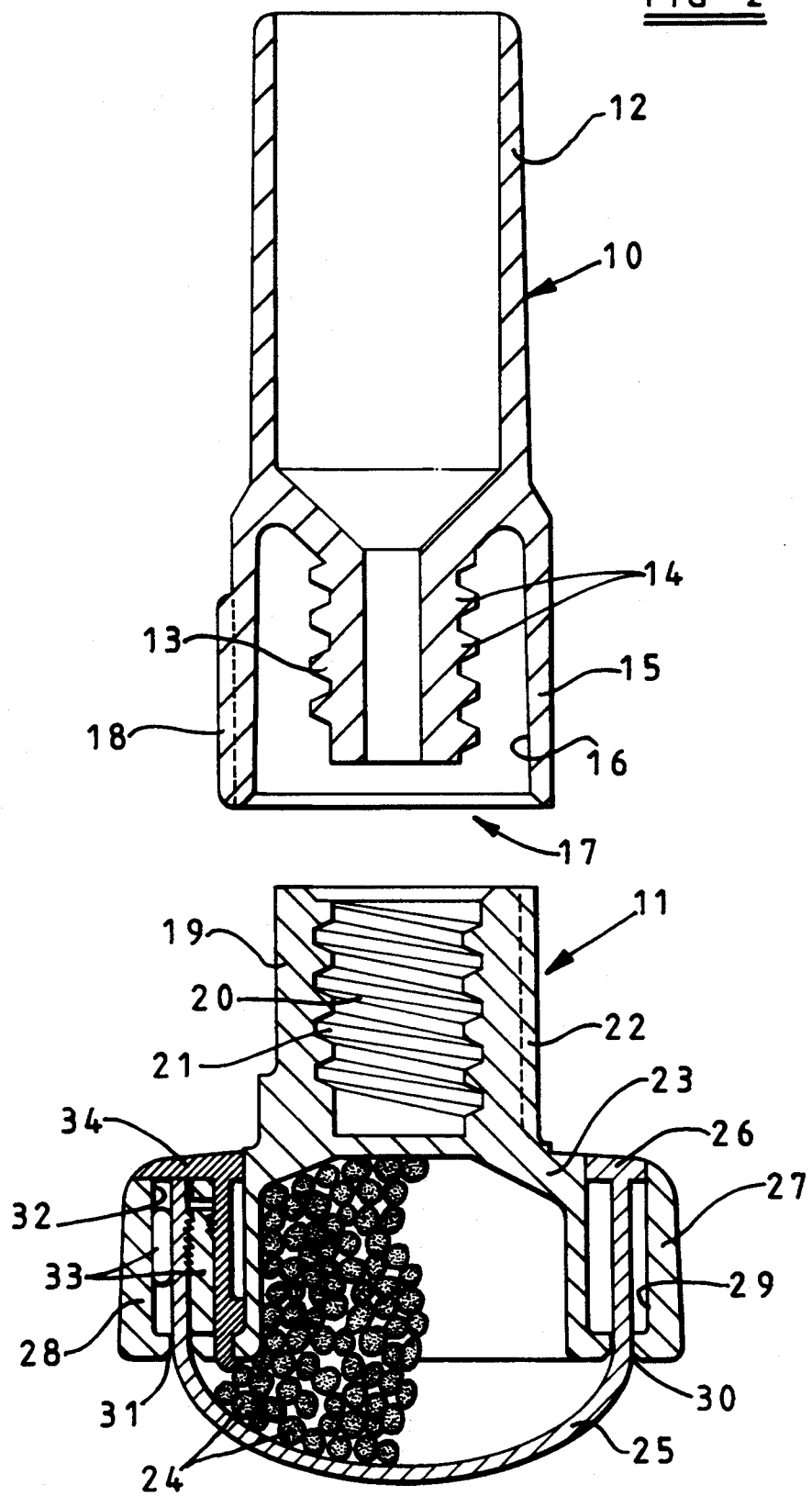
FIG. 2 is a longitudinal sectional view of the mop head holder and connector, on an enlarged scale, the two components being shown separated.

As best seen in FIG. 2, extending away from the closed end of the socket 12 is a central hollow spigot 13 which is coaxial with the socket 12 and is formed with external screw threads 14. A co-axial circular cross-section shroud 15 surrounds the spigot 13 and is spaced outwardly thereof. The axial length of the shroud 15 is slightly greater than that of the spigot 13 so that the spigot is wholly contained within the shroud.

The inner surface 16 of the shroud tapers outwardly by about 1° as it extends towards the mouth 17 of the shroud. The generally cylindrical outer surface of the shroud 15 is formed with a plurality of circumferentially spaced axially extending ribs 18.

The second component 11, for mounting on the mop head or other implement, comprises a generally cylindrical boss 19 formed with an internal socket 20 which is internally screw-threaded as indicated at 21. The socket 20 and threads 21 are designed to cooperate with the threaded spigot 13 so that the spigot can be screwed tightly into the socket to join the two parts of the connector together.

The outer peripheral surface of the boss 19 is formed with a plurality of circumferentially spaced axially extending ribs 22. The outer dimensions of the boss 19 and ribs 22 are such that the ribs 22 are firmly and frictionally engaged by the internal surface 16 of the shroud 15 as the two components are screwed together. The shroud thereby provides additional support and strength to the spigot 13 which does not therefore have to bear the full stress to which the connector is subjected when the mop is in use.

As previously referred to, a connector according to the invention may be used for connecting a similar handle selectively to any one of a whole range of different implements. Accordingly, the second component 11 of the connector may be adapted as part of, or for connection, to many different types of implement requiring an elongate handle. For example, the component 11 on which the internally threaded cylindrical boss 19 is formed may be designed for incorporation in or attachment to any form of implement such as a floor mop, duster, sweeper, wall washer, flat mop, broom, cleaning brush, paint brush, paint roller or the like. The embodiment of the invention according to the drawings shows, by way of example, a second component 11 forming part of a particular type of mop head, but this is only one of the many different kinds of implement with which the invention may be employed. Due to the extra strength and reliability of the connector, according to the invention, a single handle may be interchanged between a whole range of different implements as required, without failure of the connector, thus obviating the necessity of providing each and every implement with a separate handle. This not only facilitates manufacture and storage of the implements, but also enables an operator more easily and conveniently to transport a whole range of different implements to the site at which they are to be used, since only a single handle has to be transported with the different implement heads.

Referring again to the arrangement shown by way of example in the drawings, integrally formed with the connector part 11 is an inverted cup-shaped holder 23, from which freely hang the ends of a multiplicity of textile strands or "threads" 24 secured to the holder at their middle by a moulded plastics strap 25. As can be seen from the sectional view of FIG. 2, the strap 25 has an enlarged head 26 by which it is secured at one end to the cup-shaped part 23. The cup-shaped part 23 is moulded with diametrically opposite edge bosses 27 and 28, and the head 26 of the strap has a tapered shape which fits in a tapered recess 29 moulded in the boss 27 at the upper side of the body 23. In addition to securing the headed end of the strap 25, the head 26 acts as a trim to close off the recess 29 substantially flush with the outer surface of the cap-shaped part 23.

From the recess 29 the strap 25 projects from the lower side of the cup-shaped part 23 through a rectangular aperture 30, and then extends under tension across the strands 24 before it re-enters the cup-shaped part 23 through a rectangular aperture 31 in the boss 28. This holds the strands 24 firmly and securely within the hollow center of the cup-shaped part 23, and through the aperture 31 the strap 25 passes into a moulded tapering rectangular-section slot 32 in the boss 28. The inner and outer walls of the slot 32 taper slightly towards one another as they extend downwardly as seen in FIG. 2. Within this slot 32 the strap 25 is retained, under tension, by a toothed retaining clip 33, the teeth of which engage with a complementarily-toothed section of the strap 25 in a ratchet-like manner which enables the strap to be pulled through under a tension which is retained by the toothed engagement.

A locking member 34 is inserted in the slot 32 after the strap 25 has been tensioned. The upper part of the locking member also acts as a trim to close off neatly the upper part of the slot 32 substantially flush with the outer surface of the cup-shaped part 23. The locking member 34 has teeth which, as it is inserted, engage complementary teeth on the retaining clip 33 in a ratchet-like manner. This securely retains the locking member 34 in the locking position in which it wedges the clip 33 and strap 25 firmly into engagement within the slot 32. This firmly retains the toothed portion of the strap 25 within the cup-shaped part 23.

In the embodiment shown, the component 11 incorporates a holder 23 which is designed for attachment to a particular form of mop, but it will be appreciated that the boss 19 may be provided on any appropriate form of structure for attachment to an implement, depending on the design of the implement and the form of attachment required.

The two components 10 and 11 are preferably formed from plastics material but the invention does not exclude arrangements where one or both of the components are formed from metal. In the case where the components are formed from plastics, the basic structure of each component may be injection moulded, the external threads 14 being subsequently machined on to the spigot 13 and the threads 21 being machined in the socket 20. In this case the ribs 18 and 22 on the two components respectively may also serve the function of providing means whereby each component may be gripped when mounted for machining.

The slight outward tapering of the internal surface 16 of the shroud 15 serves to facilitate release of the component from the injection mould as well as increasing the frictional engagement between the shroud and boss 19 as the two components are screwed together.

Figure 3:
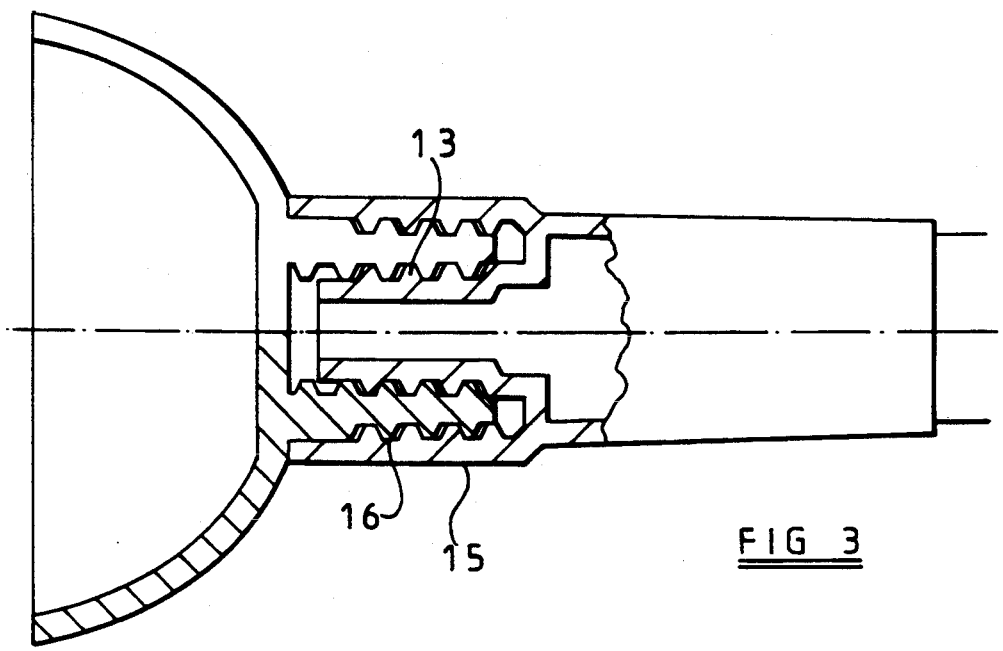
FIGS. 3 and 4 depict alternative embodiments of the connector in accordance with the invention.

Although the described arrangement is preferred in which only the spigot 13 and socket 20 are in screw-threaded engagement, as previously mentioned the invention also includes arrangements where the internal surface 16 of the shroud 15 is provided with screw threads which engage cooperating screw threads on the outer surface of the boss 19 as depicted in FIG. 3. Such screw threads on the shroud may be provided in addition to the screw threads on the spigot 13 in which case it will be appreciated that the pitches of the two screw threads should be substantially equal. However, a very slight difference in the pitches of the screw threads may result in an advantageous locking effect as the component 10 is screwed on to the component 11.

Figure 4:
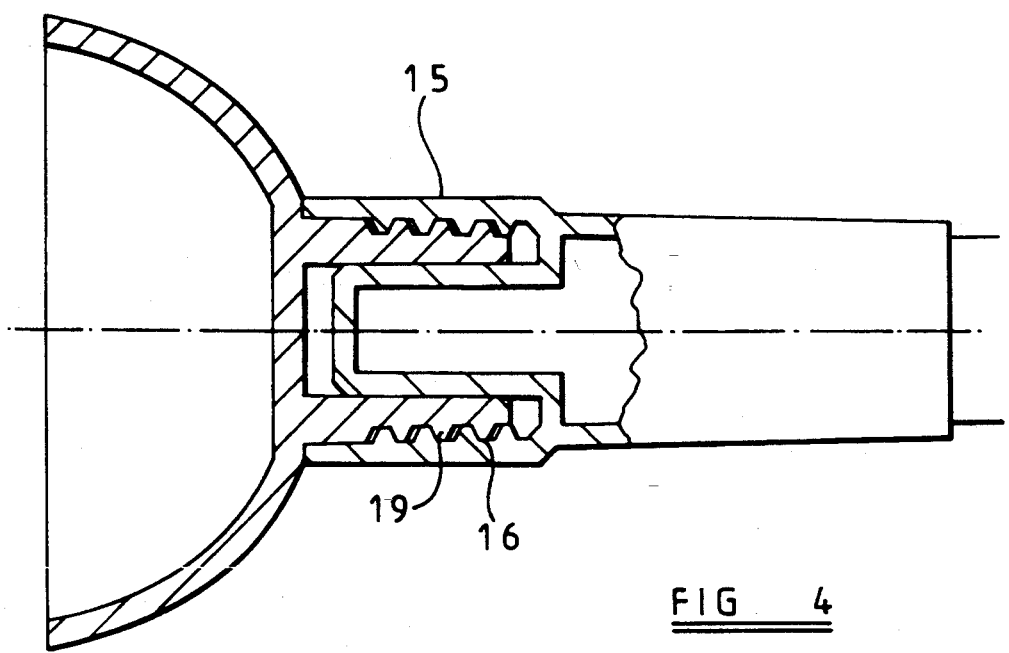

In an alternative arrangement as best seen in FIG. 4, the inter-engaging screw threads are provided only on the shroud 16 and outer surface of the boss 19 and the spigot 13 is simply a friction fit within the socket 20, the inter-engaging surfaces of the spigot 13 and socket 20 being smooth or being formed with inter-engaging frictional formations such as axially extending ribs.

What is claimed is:

1. A connector comprising two engageable plastic components for mounting on a shaft and an implement respectively, one of said components having a boss formed with an internal circular cross-section screw-threaded socket and having an outer peripheral surface surrounding the socket, said one component being mounted to said implement, and the other component having a central circular cross-section screw-threaded spigot for screw-threaded engagement with the socket and a circular cross-section shroud surrounding the spigot and spaced therefrom and adapted to frictionally engage said outer peripheral surface of the boss when the spigot is screwed into the socket, the spigot and shroud being integral parts of said other component and at least one of the inner surface of the shroud and the outer surface of the boss being tapered so that the frictional engagement between the shroud and boss increases as the spigot is screwed into the socket, and said other component including a socket substantially coaxial with the spigot and shroud, and which retains an end of said shaft.

2. A connector according to claim 1, wherein the outer surface of the boss is formed with outstanding projections which are frictionally engaged by the inner surface of the shroud.

3. A connector according to claim 2, wherein said projections are in the form of circumferentially spaced ribs extending substantially axially of the boss.

4. A connector according to claim 1, wherein the outer surface of the shroud includes formations to facilitate gripping and manipulation of said other component on which it is provided.

5. A connector according to claim 4, wherein said formations comprise circumferentially spaced ribs extending generally axially of the shroud.

6. A connector according to claim 1, wherein said one component for mounting on the implement includes a generally circular flange structure, generally coaxial with the boss and extending outwardly therefrom at one end of the boss, said flange structure having means for securing it to said implement.

7. A connector according to claim 1, wherein said one component is attached to a mop head, and said other component is attached to one end of an elongate mop handle.

* * * * *